(12) United States Patent
Haswarey et al.

(10) Patent No.: US 8,042,150 B2
(45) Date of Patent: Oct. 18, 2011

(54) AUTOMATIC GENERATION OF POLICIES AND ROLES FOR ROLE BASED ACCESS CONTROL

(75) Inventors: Bashir A. Haswarey, Elmhurst, IL (US); John J. Milligan, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 466 days.

(21) Appl. No.: 12/329,910

(22) Filed: Dec. 8, 2008

(65) Prior Publication Data

US 2010/0146584 A1 Jun. 10, 2010

(51) Int. Cl.
G06F 17/00 (2006.01)
G06F 17/30 (2006.01)
(52) U.S. Cl. .................... 726/1; 726/2; 726/3
(58) Field of Classification Search .......... 726/1, 2, 726/3
See application file for complete search history.

(56) References Cited

U.S. PATENT DOCUMENTS

| | | | |
|---|---|---|---|
| 6,202,066 | B1 | 3/2001 | Barkley et al. |
| 6,327,618 | B1 | 12/2001 | Ahlstrom et al. |
| 7,607,164 | B2 | 10/2009 | Vasishth et al. |
| 2004/0225893 | A1 | 11/2004 | Ng |
| 2005/0138419 | A1 | 6/2005 | Gupta et al. |
| 2005/0138420 | A1 | 6/2005 | Sampathkumar et al. |
| 2005/0193196 | A1 | 9/2005 | Huang et al. |
| 2006/0089932 | A1 | 4/2006 | Buehler et al. |
| 2006/0112426 | A1 | 5/2006 | Smith et al. |
| 2007/0056018 | A1 | 3/2007 | Ridlon et al. |
| 2007/0056019 | A1 | 3/2007 | Allen et al. |
| 2007/0214352 | A1 | 9/2007 | Convery et al. |
| 2007/0240231 | A1 | 10/2007 | Haswarey et al. |
| 2008/0184336 | A1 | 7/2008 | Sarukkai et al. |
| 2008/0295145 | A1 | 11/2008 | Haswarey et al. |

FOREIGN PATENT DOCUMENTS

| | | |
|---|---|---|
| WO | 0250691 A1 | 6/2002 |
| WO | 03107178 A2 | 12/2003 |
| WO | 2004109971 A1 | 12/2004 |

OTHER PUBLICATIONS

Data Acquisition Backbone Core DABC; Adamczewski, J.; Essel, H.G.; Kurz, N.; Linev, S.; Real-Time Conference, 2007 15th IEEE-NPSS; Publication Year: 2007, pp. 1-5.*

Rapid and low-cost context-switch through embedded processor customization for real-time and control applications Xianarong Zhou; Petrov, P.; Design Automation Conference, 2006 43rd ACM/IEEE Publication Year: 2006, pp. 352-357.*

(Continued)

*Primary Examiner* — David Y Jung (57) ABSTRACT

A method (400) of automatically generating policies and/or roles for role based access (RBAC). The method can include presenting a policy or policy generation table (300) identifying scripts (304) and roles (302) to which the scripts correspond to an operator, and receiving at least one operator input selecting a plurality of desired scripts to be associated with a desired policy or role. The method also can include parsing the scripts to identify corresponding verb-switches (204), and comparing the parsed verb-switches to existing policies or roles (114). When there is at least one of the parsed verb-switches that does not correspond to at least one existing policy, the parsed verb-switch that does not correspond to at least one existing policy can be identified and a policy (106) that includes the identified verb-switch can be generated.

20 Claims, 4 Drawing Sheets

OTHER PUBLICATIONS

The real-time ObjectAgent software architecture for distributed satellite systems; Surka, D.M.; Brito, M.C.; Harvey, C.G.; Aerospace Conference, 2001, IEEE Proceedings.; vol. 6 Publication Year: 2001, pp. 2731-2741 vol. 6.*

Masood, Ammar et al.: "Test Generation for Access Control Systems that Employ RBAC Policies", SERC-TR-285, Purdue University, 2005, pp. 1-13.

Grsecurity website, grsecurity for SELinux, http://www.grsecurity.net/features.php (1of 4) downloaded Dec. 5, 2008.

M. Nyanchama, S. Osborn: "The Role Graph Model and Conflict of Interest" Online Feb. 1,1999, URL: portal.acn.org/citation.cfm?if=300830. pp. 3-33.

Al-Kahtani, Mohammad A. et al.: Induced Role Hierarchies with Attribute-Based RBAC, SACMAT'03, Jun. 2-3, 2003, Como, Italy, Copyright 2003 ACM 1-58113-681-1/03/0006, pp. 142-148.

Ferraiolo, David F. et al.: A Role-Based Access Control Model and Reference Implementation Within a Corporate Intranet, 1999 ACM 1094-9224/99/0200-0034, ACM Transactions on Information and System Security, vol. 2, No. 1, Feb. 1999, pp. 34-64.

* cited by examiner

| Roles<br>Verb-<br>Switches | Fault<br>Management | Configuration<br>Management | Performance<br>Monitoring | Load<br>Management |
|---|---|---|---|---|
| Add | | X | | X |
| Audit | X | | X | |
| Delete | | X | | X |
| Edit | X | X | | X |
| Display | X | X | X | |
| Move | | | | X |
| Init | X | X | | |
| Generate | X | | | |
| Diagnose | X | | | |
| ClrAlm | X | | | |

| Roles<br>Scripts | Fault<br>Management | Configuration<br>Management | Performance<br>Monitoring | Load<br>Management |
|---|---|---|---|---|
| Script A | | X | X | |
| Script B | | | | |
| Script C | | | | |
| Script D | | | | |
| Script E | | | | |
| Script F | | | | |
| Script H | | X | | |
| Script I | | | | |
| Script J | | | | |
| Script K | | | | |

```
┌─────────────────────────────────────────────────────────────┐
│ Present to an operator a policy generation table identifying│
│ scripts and roles to which the scripts correspond and which │
│ is configured to receive user inputs selecting at least a   │
│ one or more scripts associated with one or more roles       │
│                                                         402 │
└─────────────────────────────────────────────────────────────┘
                             │
                             ▼
┌─────────────────────────────────────────────────────────────┐
│ Receive one or more operator inputs selecting a plurality of│
│ desired scripts to be associated with a desired policy or   │
│ role                                                    404 │
└─────────────────────────────────────────────────────────────┘
                             │
                             ▼
┌─────────────────────────────────────────────────────────────┐
│ Optionally, automatically select at least one additional    │
│ script                                                  406 │
└─────────────────────────────────────────────────────────────┘
                             │
                             ▼
┌─────────────────────────────────────────────────────────────┐
│ Optionally, receive one or more scripts not identified by   │
│ the policy generation table                             408 │
└─────────────────────────────────────────────────────────────┘
                             │
                             ▼
┌─────────────────────────────────────────────────────────────┐
│ Parse from the selected scripts verb-switches contained     │
│ within the selected scripts and compare each of the parsed  │
│ verb-switches to existing policies                      410 │
└─────────────────────────────────────────────────────────────┘
                             │
                             ▼
                    ╱ Is there    ╲
                   ╱ at least one  ╲
                  ╱ parsed          ╲         No
                 ╱ verb-switch that  ╲──────────────▶ ( A )
                 ╲ does not correspond╱
                  ╲ to at least one  ╱
                   ╲ existing policy?╱
                    ╲      412     ╱
                             │
                            Yes
                             ▼
                          ( B )
```

AUTOMATIC GENERATION OF POLICIES AND ROLES FOR ROLE BASED ACCESS CONTROL

BACKGROUND OF THE INVENTION

1. Field of the Invention

The present invention generally relates to the control of access to a system and, more particularly, to role based access control.

2. Background of the Invention

Role based access control (RBAC), which is also referred to as role based security, is commonly used to secure access to critical resources within an organization. For example, roles are created for various job functions within the organization, and permissions to perform certain operations are assigned to one or more of the roles that have been created. Users also are assigned to one or more of the roles, and through those role assignments, acquire the permissions to access information and perform operations within the system.

Since the users are not assigned permissions directly, but only acquire permissions through their assigned role (or roles), management of individual user rights becomes a matter of assigning the appropriate role or roles to each user. Common operations, such as adding users or changing permissions for groups of users, thus can be performed in a relatively simple manner.

The derivation of RBAC policies and roles is typically performed by an operator manually parsing operation and maintenance (O&M) scripts to retrieve verb-switches that are required to define a policy or role. The number of verb-switches that are required can number in the tens or even hundreds, and human errors often occur during the parsing process. For example, an incorrect verb-switch may be parsed, or attributes corresponding to a particular verb-switch may be accidentally missed. When errors occur, gaps in security can result, thereby increasing the risk of security breaches.

SUMMARY OF THE INVENTION

The present invention relates to a method of automatically generating policies for role based access (RBAC). The method can include presenting a policy generation table identifying scripts and roles to which the scripts correspond to an operator, and receiving at least one operator input selecting a plurality of desired scripts to be associated with a desired policy. The method also can include parsing from the selected scripts verb-switches contained within the selected scripts and comparing each of the parsed verb-switches to existing policies. When there is at least one of the parsed verb-switches that does not correspond to at least one existing policy, the parsed verb-switch that does not correspond to at least one existing policy can be identified and a policy that includes the identified verb-switch can be generated.

Another aspect of the present invention relates to a method of automatically generating roles for RBAC. The method can include presenting a policy generation table identifying scripts and roles to which the scripts correspond to an operator, and receiving at least one operator input selecting a plurality of desired scripts to be associated with a desired policy. The method also can include parsing from the selected scripts verb-switches contained within the selected scripts and comparing each of the parsed verb-switches to existing roles. When there is not at least one existing role to which each of the verb-switches corresponds, a role that includes each of the parsed verb-switches can be generated.

Yet another embodiment of the present invention can include a RBAC policy/role generator that performs the various steps and/or functions described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to automatically generating policies and roles for role based access control (RBAC). In particular, the arrangements provide a process in which operation and maintenance (O&M) scripts, either existing or newly generated, may be utilized to automatically generate policies and/or roles (hereinafter "policies/roles"). As used herein, the term "policy" means a group of one or more rules applicable to a particular target object. As used herein, a "role" means a group of one or more policies intended to be applied to at least one user or at least one group of users. Automatically generating policies/roles as described herein can mitigate the introduction of errors that lead to increased risk of security breaches. Moreover, such automation can streamline policy/roles implementation within a system.

Figure 1:
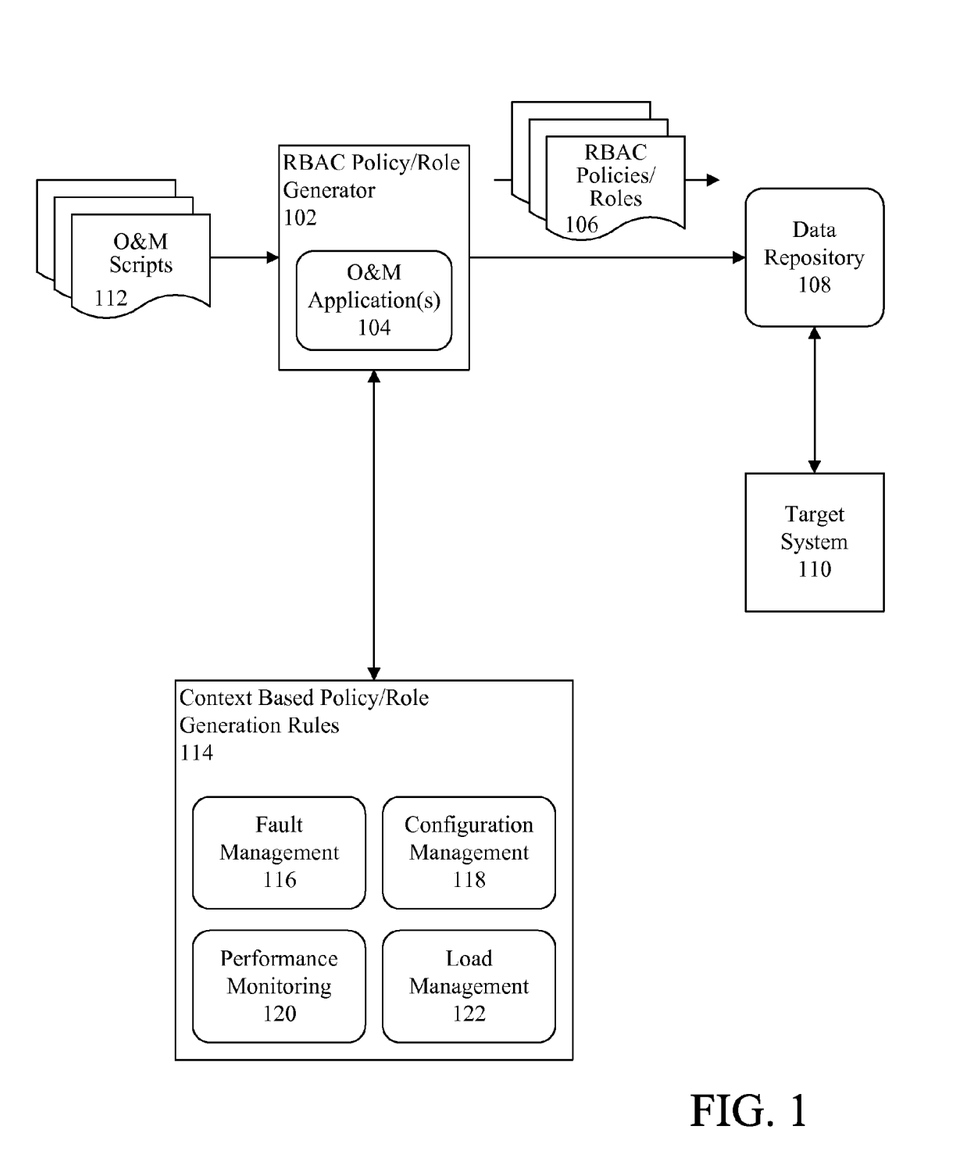
FIG. 1 depicts an information system that is useful for understanding the present invention.

FIG. 1 depicts an information system 100 that is useful for understanding the present invention. The information system 100 can include a RBAC policy/role generator 102. The RBAC policy/role generator 102 can include one or more O&M applications 104 with which an operator, such as a system administrator, may interact to generate RBAC policies/roles 106. In that regard, the O&M application(s) 104 can include a user interface that is presented to the operator, as well as functions that process operator inputs and automatically generate the appropriate policies/roles 106, as will be described herein in greater detail.

The policies/roles 106 generated by the RBAC policy/role generator 102 can be stored to a suitable data repository 108 from which the policies/roles 106 can be accessed by a target system 110 in which the policies/roles 106 may be implemented. The data repository 108 can be a component of the target system 110, or otherwise communicatively linked to the target system 110 via a communication network or a communication bus. In one arrangement, the target system 110 can be an operational support system (OSS) for a voice and/or data communication network. The target system 110 also can be another type of system, for instance a domain controller, a network controller or a computer information system. Still, the target system 110 can be any other type of system that implements RBAC and the invention is not limited in this regard.

To generate the policies/roles 106, the O&M application 104 can access O&M scripts 112 and context based policy/role generation rules (hereinafter "generation rules") 114. The O&M scripts 112 can be O&M scripts suitable for processing by the O&M applications 104 in order to derive the policies/roles 106 that are generated. Specifically, the O&M scripts 112 can contain verb-switches that define rules for policies applicable to target objects. In particular, one or more verb-switches may define rules for a policy applicable to a particular target object. The O&M scripts 112 may be predefined or defined by the operator.

As used herein, the term "verb-switch" means an identifier that includes one or more attributes that correspond to one or more managed objects, as well as one or more attributes that indicate at least one action that is available to be performed on the managed object(s). Verb-switches also may include one or more attributes that indicate applicable limitations to such action(s). As used herein, the term "managed object" means an abstract representation of system resources that are to be managed. In this regard, a managed object may represent a physical entity, a system service, or an abstraction within the system of a resource that exists independently of the system.

The following is example of an O&M script 112:
"edit cbsc-cbsc# dscp [class1] [class2] [class3] [class4]"
In the above example the verb is "edit," the switch is "dscp," the managed object is "cbsc-cbsc#," and "[class1]," "[class2]" are operator specified target values.

The generation rules 114 can include a plurality of policies, each comprising at least one rule, that have been associated with various roles. The policies contained in the generation rules 114 may be used, along with the O&M scripts 112, to generate desired policies/roles. For example, the generation rules 114 can include policies previously defined for various roles, for instance as templates, using O&M scripts 112 such as those described herein. In one arrangement, the various sets of the generation rules 114 can be orthogonal, meaning that a particular verb-switch is not contained in more than one set of policies contained within the generation rules 114.

Fault management rules 116, for example, can be associated with a fault management role. The fault management rules 116 can define policies which include verb-switches contained in the O&M scripts 112 that may be applied when a fault within the target system 110 is discovered. Examples of such verb-switches can include those that may be implemented to trigger audit or diagnostic functions when a fault is identified. Other verb-switches may trigger certain types of messages to be generated when faults are detected, diagnostic routines that are to be initiated, initialization routines, edit routines, data generation routines, and routines which clear alarms. Still, a myriad of other verb-switches can be identified by the fault management rules 116 and can be implemented in the present arrangements.

Configuration management rules 118 can be associated with a configuration management role. The configuration management rules 118 can define policies which include verb-switches which may be applied when system configuration tasks are to be performed on the target system 110. These verb-switches can indicate, for example, routines that are implemented when adding, deleting, editing, displaying and initializing certain managed objects, as well as restrictions on such actions. Again, the configuration management rules 118 also may be defined by other suitable verb-switches.

Further, performance monitoring rules 120 can be associated with a performance monitoring role, which can define policies which include verb-switches that are applicable to monitoring performance of the target system 110. Examples of such verb-switches can include those that identify routines for auditing and displaying performance measurements associated with the target system 110, as well as verb-switches that pertain to any other performance monitoring tasks.

Similarly, load management rules 122 can be associated with a load management role. The load management rules 122 can define policies which include verb-switches that are applicable when load balancing tasks are performed on the target system 110. Examples of these verb-switches can include verb-switches that identify managed objects that can be added, deleted, edited and moved, verb-switches that define when such actions can be implemented, and verb-switches that impose various restrictions on these actions. Still, other verb-switches can be implemented to define generation rules 114, and the invention is not limited in this regard.

Figure 2:
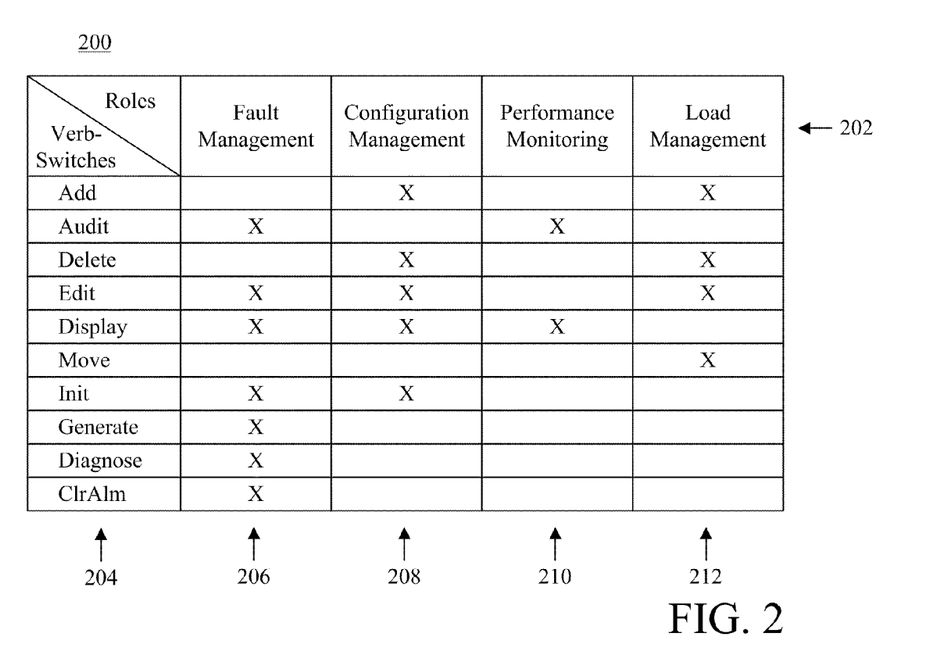
FIG. 2 depicts a rules table that is useful for understanding the present invention.

Referring to FIG. 2, a rules table 200 is presented that is useful for understanding the relationship between verb-switches and roles. The rules table 200 identifies various roles 202 and verb-switches 204 for rules that define policies for the various roles 202. Specifically, cells 206, 208, 210, 212 that are marked with an "X" indicate that verb-switches 204 in their respective rows are used to define policies for the roles 202 in their respective columns. For example, the verb-switches 204 that have been selected for the "Fault Management" role can be those that correspond to the cells 206 that are marked with an "X." The rules defined by the verb-switches for each role 202 collectively form a policy for that role 202.

Notably, certain verb-switches 204 may be used to define more than one policy. In this example, the verb-switch "ADD" is used to define a policy for the "Configuration Management" role and a policy for the "Load Management" role. Similarly, the verb-switch "Edit" is used to define a policy for the "Fault Management" role, a policy for the "Configuration Management" role, and a policy for the "Load Management" role. Nonetheless, some verb-switches 204 may only be implemented to define a policy for a single role. For instance, the verb-switch "Move" is used only to define a policy for the "Load Management" role.

Having described how verb-switches 204 may be associated with various roles 202 to form respective policies, arrangements now will be described in which verb-switches contained in various O&M scripts and known generation rules can be utilized by the O&M application(s) to automatically generate policies and roles. In this regard, generating policies/roles can include generating new policies/roles or updating existing policies and roles.

Figure 3:
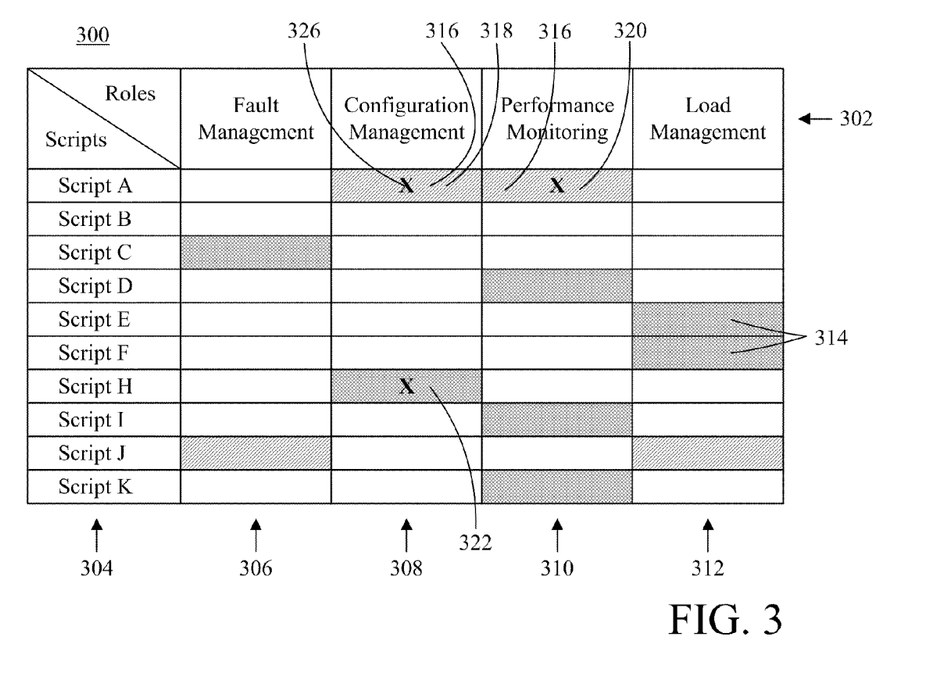
FIG. 3 depicts a policy generation table that is useful for understanding the present invention.

Referring to FIG. 3, a policy generation table 300 is depicted, which is useful for understanding the present invention. The policy generation table 300 can identify various roles 302 and O&M scripts 304 which contain verb-switches that may be used to define policies for the various roles 302, and which may be used to generate policies/roles. In the example, the O&M scripts 304 are identified as "Script A" through "Script K." Nonetheless, more descriptive terms can be used to identify the various O&M scripts 304. For example, terms can be used which indicate which verb-switches are contained in the various O&M scripts 304. Cells 306, 308, 310, 312 within the policy generation table 300 can correspond to roles 302 with which the cells 306-312 are aligned (e.g. vertically aligned), and the cells 306-312 can correspond to O&M scripts 304 with which the cells 306-312 also are aligned (e.g. horizontally aligned).

During the policy/role generation process, the O&M application can present the policy generation table 300 to an operator. When certain O&M scripts 304 are applicable to certain roles 302, the cells 306-312 corresponding to the roles 302 and the applicable O&M scripts 304 can be identified, for instance using indicators 314, 316. For example, when a role 302 has complete access to a particular O&M script 304, an indicator 314 can be presented. When a role 302 has partial access to an O&M script, an indicator 316 can be presented.

The indicators 314, 316 can be represented as shades, colors, text, other identifiers applied to the cells 306-312, or in any other suitable manner. Based on the indicators 314, 316, the operator can be made cognizant of the types of verb-switches contained in the O&M scripts 304 that are fully accessible by a particular role. In one arrangement, the indicators 314, 316 that are presented can be associated with particular verb-switches to indicate the verb-switches that correspond to the various roles 302, but this need not be the case.

The cells 306-312 identified by the indicators 314, 316 can be configured to receive operator selections to identify which O&M scripts 304 that are to be used to generate policies and/or roles. To choose a particular O&M script 304, the operator can select a cell 306-312 that is aligned both with the desired O&M script 304 and a role 302 with which the O&M script 304 is applicable.

For example, the operator can select a cell 318 corresponding to "Script A" to associate verb-switches in "Script A" that are aligned with "Configuration Management" with the policy/role being generated. If the operator selects any cell 306-312 associated with a particular O&M script 304, all functionality of that O&M script can be provided for policy/role to be generated. For example, if the operator has selected a cell 318 associated with "Script A" and "Configuration Management," the portion of "Script A" associated with the "Performance Monitoring" role can be automatically selected. Similarly, if the operator has selected to associate "Script A" and "Performance Monitoring" by selecting cell 320, the portion of "Script A" associated with the "Configuration Management" role can be automatically selected. Thus, by selecting a particular cell 306-312 associated with a particular O&M script 304, all verb-switches associated with that O&M script 304 can be associated with the policy/role being generated.

In one arrangement, if the operator has selected an O&M script 304 associated with a particular role 302, all other O&M scripts 304 associated with that role 302 can be automatically selected. For example, if the operator selects cell 318 which is aligned both with "Script A" and the "Configuration Management" role, "Script H", identified by cell 322, can be automatically selected and for association with the generated policy/role. Accordingly, verb-switches in "Script H" can be automatically selected. Nonetheless, the automatic selection of such additional O&M scripts 304 is not required.

The operator selections and operator inputs can be performed in any suitable manner. For instance the operator can appropriately select the cells 318-322 with a cursor. When the cells 318-322 are selected, an identifier 326 can be presented for the selected cells 318-322 to indicate the operator selections, as well as any automatic O&M script 304 selections that have been implemented. Again, any suitable identifiers 326 can be used and the invention is not limited in this regard. In addition, suitable operator input fields can be provided for the operator to select O&M scripts not identified in the policy generation table 300. For example, the operator can select O&M scripts that are not presently instantiated within the information system 100.

Once the desired cells 318-322 have been selected and any additional O&M scripts have been identified, the operator can initiate the policy/role generation. For example, the operator can enter an appropriate input, for instance by selecting a suitable icon or a menu item, or by entering a particular keystroke that is recognized by the O&M application(s). Processing of the operator selections by the O&M application(s) to generate the policies/roles can be understood by referring to the flowchart of FIG. 4.

Figure 4:
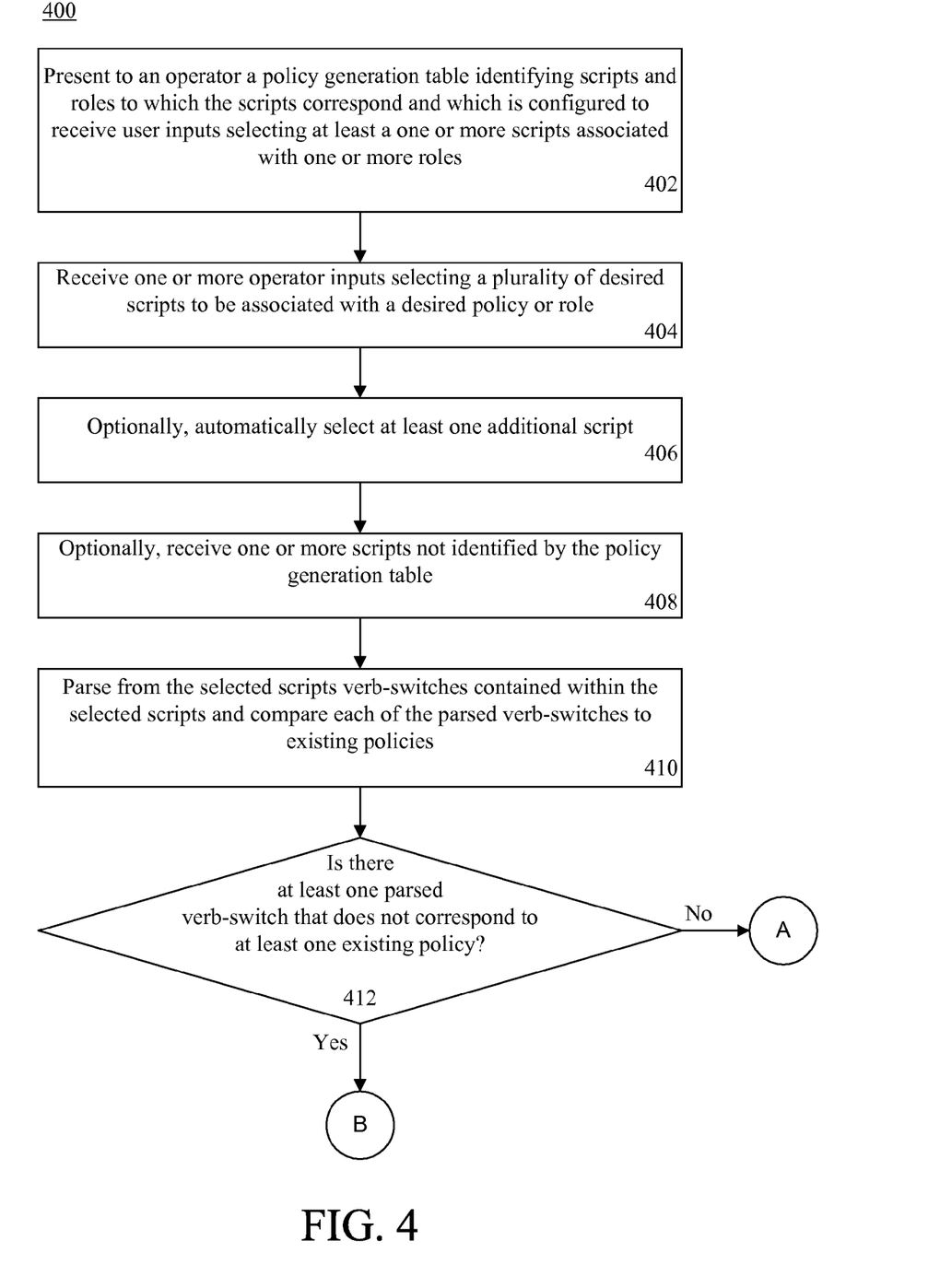
FIG. 4 is a flowchart presenting a method of generating policies and roles that is useful for understanding the present invention.

The flowchart of FIG. 4 presents a method 400 of generating policies and roles which is useful for understanding the present invention. The method 400 can be implemented, for example, by the RBAC policy/role generator 102 of FIG. 1. At step 402, a policy generation table can be presented to an operator. The policy generation table can identify scripts, for instance O&M scripts, and roles to which the scripts correspond, and can be configured to receive operator inputs selecting one or more scripts associated with one or more roles.

At step 404, one or more operator inputs can be received to select a plurality of desired scripts that are to be associated with a policy/role being generated. Optionally, at step 406, one or more additional scripts can be automatically selected in response to the operator selections made in step 404. For example, the automatically selected scripts can be associated with a role to which an operator selected script corresponds.

Optionally, at step 408 one or more scripts not identified by the policy generation table can be received. Such scripts can correspond to operator inputs. For example, a script can be identified by one or more operator inputs that identify the script at a particular data storage location. In this regard, there may be verb-switches contained in the operated selected scripts that do not correspond to existing policies or roles.

At step 410, verb-switches contained within the selected scripts can be parsed from the selected scripts. Further, the parsed verb-switches can be compared to existing policies. For example, each of the parsed verb-switches can be compared to verb-switches contained in existing policies, and policies containing one or more of the verb-switches can be identified.

Figure 5:
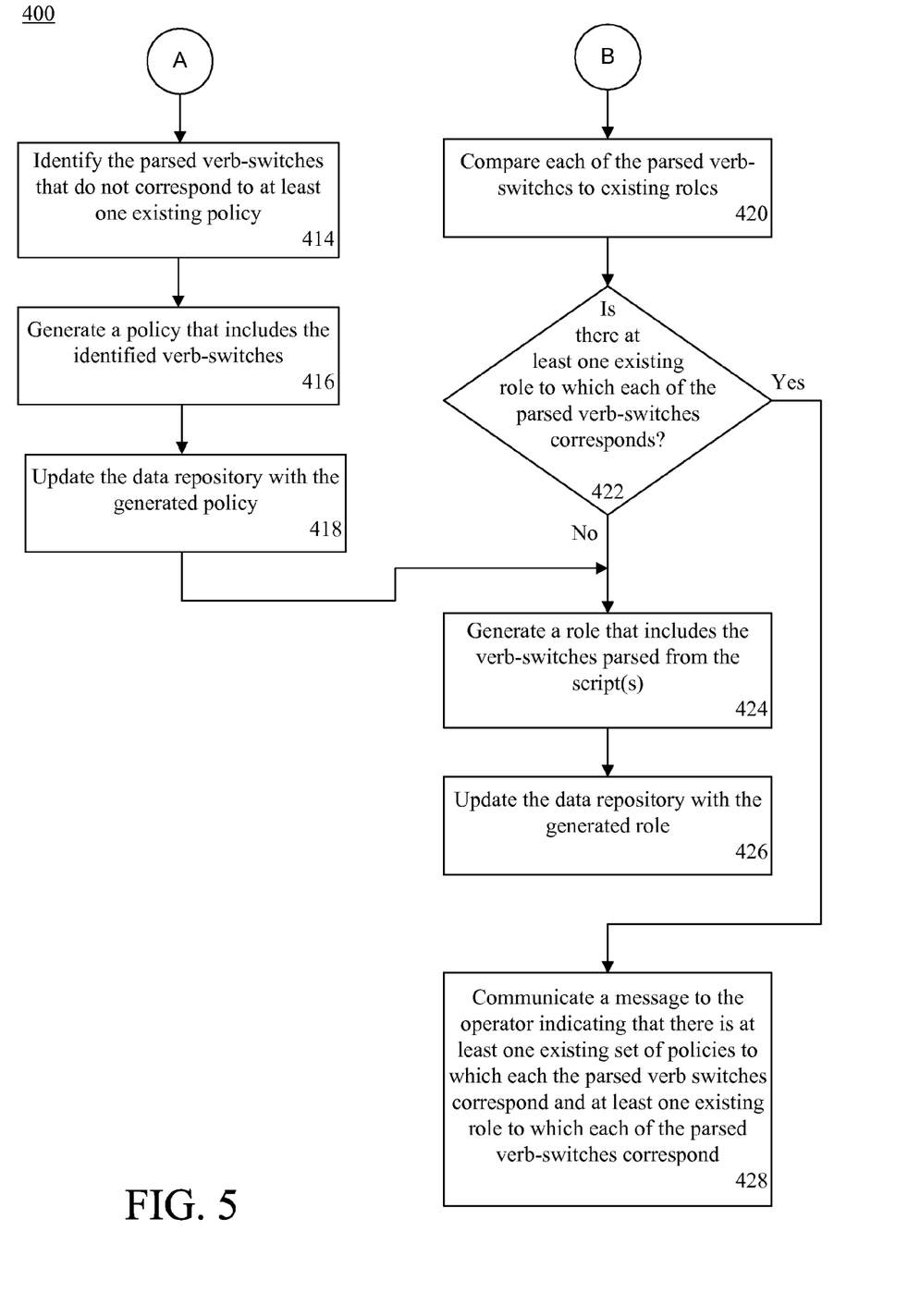
FIG. 5 is a continuation of the flowchart of FIG. 4.

Referring to decision box 412, if there is at least one parsed verb-switch that does not correspond to at least one existing policy, the process can proceed to step 414 of FIG. 5. At step 414, the parsed verb-switches that do not correspond to at least one existing policy can be identified.

At step 416, a policy can be generated that includes the identified verb-switches. In one arrangement, generating a policy can include generating a policy that does not already exist. In another arrangement, generating a policy can include adding the verb-switches that are not already contained in an existing policy to the existing policy. Adding the verb-switches to an existing policy can entail replacing the existing policy with the policy that is generated, or appending to the existing policy with the identified verb-switches that are not already contained in the existing policy. In this arrangement, one or more operator inputs can be received that indicate the existing policy that is to be updated with the identified verb-switches.

At step 418, a suitable data repository can be updated with the policy that is generated. For example, the script(s) containing the identified verb-switch(es) can be associated with the generated policy in the data repository. The process then can proceed to step 424, which will be described.

Referring again to decision box 412 of FIG. 4, if there are not any parsed verb-switches which do not correspond to at least one existing policy, the process can proceed to step 420 of FIG. 5. At step 420, each of the parsed verb-switches can be compared to existing roles. That is, a determination can be made as to whether each of the parsed verb-switches corresponds to at least one policy within the set of policies that define an existing role.

Referring to decision box 422, if there is not at least one existing role to which each of the parsed verb-switches corresponds, at step 424 a role can be generated that includes each of the parsed verb-switches. For example, the generated role can be associated with a set of policies such that each of the verb-switches corresponds to the policy set.

In one arrangement, generating a role can include generating a role that does not already exist. In another arrangement, generating a role can include adding to an existing role the parsed verb-switches that are not already contained in the existing role. Again, adding the parsed verb-switches to an existing role can entail replacing the existing role with the role that is generated, or appending to the existing role with the parsed verb-switches that are not already contained in the existing role. As previously described, one or more operator inputs can be received that indicate the existing role that is to be updated with the parsed verb-switches. At step 426, a data repository can be updated with the role that is generated.

Referring again to decision box 422, if there is a correspondence between each of the parsed verb-switches and at least one existing role, at step 428 a message can be communicated to the operator indicating that there is at least one existing set of policies to which each of the parsed verb switches correspond and at least one existing role to which each of the parsed verb-switches correspond. The operator then can select a role that corresponds to each of the parsed verb-switches and assign that role to a user or a user class for which the operator desires to assign the role.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The present invention also can be embedded in a computer-usable medium, such as a computer program product or other data programs storage device, readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Moreover, as used herein, ordinal terms (e.g. first, second, third, fourth, fifth, sixth, seventh, eighth, ninth, tenth, and so on) distinguish one message, signal, item, object, device, system, apparatus, step, process, or the like from another message, signal, item, object, device, system, apparatus, step, process, or the like. Thus, an ordinal term used herein need not indicate a specific position in an ordinal series. For example, a process identified as a "second process" may occur before a process identified as a "first process." Further, one or more processes may occur between a first process and a second process.

This invention can be embodied in other forms without departing from the spirit or essential attributes thereof. Accordingly, reference should be made to the following claims, rather than to the foregoing specification, as indicating the scope of the invention.

What is claimed is:

1. A method of automatically generating policies for role based access (RBAC), comprising:
presenting a policy generation table identifying scripts and roles to which the scripts correspond to an operator;
receiving at least one operator input selecting a plurality of desired scripts to be associated with a desired policy;
parsing from the selected scripts verb-switches contained within the selected scripts;
comparing each of the parsed verb-switches to existing policies;
when there is at least one of the parsed verb-switches that does not correspond to at least one existing policy, identifying the parsed verb-switch that does not correspond to at least one existing policy and generating a policy that includes the identified verb-switch.

2. The method of claim 1, further comprising:
when there is not at least one of the parsed verb-switches that does not correspond to at least one existing policy, communicating a message to the operator indicating that there is at least one existing set of policies to which each of the parsed verb-switches correspond.

3. The method of claim 1, further comprising:
automatically selecting at least one additional script.

4. The method of claim 3, wherein automatically selecting at least one additional script comprises:
automatically selecting at least one additional script associated with a role to which an operator selected script corresponds.

5. The method of claim 1, further comprising:
receiving at least one script not identified by the policy generation table.

6. The method of claim 5, wherein receiving at least one script not identified by the policy generation table comprises:
receiving at least one operator input that identifies the script at a particular data storage location.

7. The method of claim 1, wherein generating the policy that includes each of the identified verb-switches comprises:
adding the identified verb-switches to an existing policy.

8. The method of claim 1, further comprising:
updating a data repository with at least one policy that is generated.

9. A method of automatically generating roles for role based access (RBAC), comprising:
presenting a policy generation table identifying scripts and roles to which the scripts correspond to an operator;
receiving at least one operator input selecting a plurality of desired scripts to be associated with a desired role;
parsing from the selected scripts verb-switches contained within the selected scripts;
comparing each of the parsed verb-switches to existing roles; and
when there is not at least one existing role to which each of the verb-switches corresponds, generating a role that includes each of the parsed verb-switches.

10. The method of claim 9, further comprising:
when there is at least one existing role to which each of the parsed verb-switches corresponds, communicating a message to the operator indicating that there is at least one existing role to which each of the parsed verb-switches correspond.

11. The method of claim 9, further comprising:
automatically selecting at least one additional script.

12. The method of claim 11, wherein automatically selecting at least one additional script comprises:
automatically selecting at least one additional script associated with a role to which an operator selected script corresponds.

13. The method of claim 9, further comprising:
receiving at least one script not identified by the policy generation table.

14. The method of claim 13, wherein receiving at least one script not identified by the policy generation table comprises:
receiving at least one operator input that identifies the script at a particular data storage location.

15. The method of claim 9, wherein generating the role that includes each of the identified verb-switches comprises:
adding the identified verb-switches to an existing role.

16. The method of claim 9, further comprising:
updating a data repository with the generated role.

17. An information system, comprising:
a role based access control (RBAC) policy/role generator that:
presents a policy generation table identifying scripts and roles to which the scripts correspond to an operator;
receives at least one operator input selecting a plurality of desired scripts to be associated with a desired policy;
parses from the selected scripts verb-switches contained within the selected scripts;
compares the parsed verb-switches to existing policies; and
when there is at least one of the parsed verb-switches that does not correspond to at least one existing policy, identifies the parsed verb-switch that does not correspond to at least one existing policy and generates a policy that includes the identified parsed verb-switch.

18. The information system of claim 17, wherein:
the RBAC policy/role generator communicates a message to the operator indicating that there is at least one existing set of policies to which each the parsed verb switches correspond.

19. The information system of claim 17, wherein:
the RBAC policy/role generator automatically selects at least one additional script.

20. The information system of claim 17, wherein:
the RBAC policy/role generator automatically receives at least one script not identified by the policy generation table.

* * * * *